United States Patent [19]

Baucke et al.

[11] Patent Number: 4,465,339
[45] Date of Patent: Aug. 14, 1984

[54] ELECTROCHROMIC MIRRORS

[75] Inventors: Friedrich G. K. Baucke; Dieter Krause; Bernd Metz; Volker Paquet; Johannes Zauner, all of Mainz, Fed. Rep. of Germany

[73] Assignee: JENAer Glaswerk Schott & Gen., Mainz, Fed. Rep. of Germany

[21] Appl. No.: 242,161

[22] Filed: Mar. 9, 1981

[30] Foreign Application Priority Data

Mar. 7, 1980 [DE] Fed. Rep. of Germany ....... 3008768

[51] Int. Cl.³ .......................... G02F 1/17; G02F 1/19; G02F 1/23
[52] U.S. Cl. .................... 350/357; 252/600
[58] Field of Search ............ 350/357, 290, 288; 252/600

[56] References Cited

U.S. PATENT DOCUMENTS

| 3,578,843 | 5/1971 | Castellion et al. | 350/357 |
| 3,712,710 | 1/1973 | Castellion et al. | 350/357 |
| 3,807,832 | 4/1974 | Castellion | 350/357 |
| 3,844,636 | 10/1974 | Maricle et al. | 350/357 |
| 4,106,862 | 8/1978 | Bayard | 350/357 |
| 4,150,879 | 4/1979 | Bayard | 350/357 |
| 4,253,742 | 3/1981 | Morita | 350/357 |
| 4,278,329 | 7/1981 | Matsuhiro et al. | 252/600 |
| 4,338,000 | 7/1982 | Kamimori et al. | 252/600 |
| 4,343,537 | 8/1982 | Guntherodt et al. | 252/600 |

FOREIGN PATENT DOCUMENTS 1563929 4/1980 United Kingdom ............... 252/600

Primary Examiner—Teddy S. Gron
Attorney, Agent, or Firm—Haight & Associates

[57] ABSTRACT

Electrochromic mirrors hermetically sealed from the ambient environment and comprising at least one electrode, at least one electrochromic layer, a reflector, at least one ion-conducting layer, and at least one ion-supplying layer which simultaneously is an ion-storing layer and is not identical with the reflector, wherein the ion-conducting layer consists essentially of an ion-conducting inorganic solid.

21 Claims, 5 Drawing Figures

ELECTROCHROMIC MIRRORS

DESCRIPTION OF THE INVENTION

1. Technical Field of the Invention

This invention generally relates to electrochromic (EC) mirrors.

2. Background Art

Material is described as being electrochromic if, upon application of an electric field, it changes its optical constants (n, k), maintains said condition after the field is switched off, and returns to its original condition after pole reversal.

Typical examples of such electrochromic materials are $WO_3$ and $MoO_3$, which are colorless and transparent when applied as a thin layer onto a glass carrier. However, if a suitable electric voltage is applied to such a layer, then suitable cations, e.g. protons, migrate from one side and electrons migrate from the other side into this layer to form the blue tungsten or molybdenum bronzes, $H_xWO_3$ and $H_xMoO_3$, respectively. The color intensity is determined by the amount of charge which has flown into said layer.

Electrochromic layers are used, among other things, for intentionally darkening optical glasses or mirrors. Such mirrors have, for example, been described in U.S. Pat. No. 3,844,636. The configuration of the mirrors described therein (in the line of sight) is as follows:

| Glass | EC-material | Metal reflector | liquid electrolyte | Counter-electrode | Transparent 2nd electrode | Glass |
|-------|-------------|-----------------|--------------------|-----|--------------------------|-------|
| 1 | 2 | 3 | 4 | 5 | 6 | 7 |

1 = substrate for 2 and 3,
2 = metallized EC layer, e.g. $WO_3$,
3 = metallized reflector layer, e.g., Pd (1st electrode),
4 = liquid electrolyte as conductor for the flow between 5 and 2,
5 = sprayed-on counter-electrode layer, e.g. graphite or graphite + $WO_3$,
6 + 7 = glass coated with $SnO_2$.

This familiar mirror acts in the following manner:

The counter-electrode supplies the necessary hydrogen ions. When a weak voltage is applied to electrodes 3 and 6 (6 poled positive), hydrogen ions migrate from 5 and electrons migrate from the voltage source into the reflector 3. From the latter, H atoms diffuse into the EC-material 2 to cause a color change, e.g., if the EC material is $WO_3$, the blue tungsten bronze, $H_xWO_3$, is formed with $0<x<1$; the value of x determines the depth of coloration.

When viewed through 1 and 2, the reflector capacity of 3 has been diminished. This condition is maintained after the voltage is switched off. In the case of pole reversal, the reverse process takes place and layer 2 again becomes colorless.

Known mirrors do, however, have several disadvantages:

1. The liquid electrolytes used are not suitable for use over the entire temperature range of $-40°$ to $+80°$ C. The auto industry, which is interested in utilizing the EC-mirror as a glare-free rear view mirror, requires that a function capability be given within the range of $-40°$ to $+80°$ C.;

2. Electrochemical reactions take place between the liquid electrolyte and the reflector and/or the counter-electrode in such a manner that the electrolyte chemically acts upon (corrodes) the reflector or counter-electrode;

3. Due to the different types of steps required in processing, (metallizing and spraying processes, filling with liquids etc.), the manufacturing process is expensive; and 4. In the case of breakage of the mirror (e.g. in a car accident), there is the danger of acid burns resulting from a spray of the acidic electrolyte.

An electrochromic mirror in which the ion-conducting layer is composed of an inorganic solid has been described in U.S. Pat. No. 3,712,710. It has the following layer sequence configuration in the line of sight:

| Glass | Transparent 2nd electrode | EC-material | Solid Electrolyte | Reflector |
|-------|--------------------------|-------------|-------------------|-----------|
| 1 | 2 | 3 | 4 | 5 |

1 = substrate for 2, 3, 4, and 5,
2 = transparent $SnO_2$-layer,
3 = metallized layer, e.g. of $WO_3$,
4 = Layer of alkali aluminate, applied by cathode sputtering, and
5 = metallized layer of alkali metal (Me).

This mirror acts in the following manner:

When a weak voltage is applied to the electrodes 2 and 5 (5 being poled positive), alkali ions migrate from 5, and electrons flow from the source of voltage into the EC-material 3 to cause a color change, e.g. in case the EC material is $WO_3$, forming the blue tungsten bronze $Me_xWO_3$, with $0<x<1$ and the value of x determining the depth of coloration.

When viewed through 1, 2, 3, and 4, the reflection capability of 5 has now been diminished. This condition remains in effect when the voltage is switched off. When the voltage is reversed, the reverse process takes place and layer 3 again becomes colorless.

Said known mirrors, however, have the following major disadvantages:

1. Since 3 and 5 are metallized and since 4 is cathode sputtered, the manufacturing process is expensive and time consuming. In particular, the manufacture of layers by cathode sputtering is very time consuming and additionally requires an expensive cathode sputtering plant or cathode sputtering facility if metallizing and sputtering takes place in the same receiver;

2. During the removal of the alkali ions from the reflector and their return to the latter, dendrites are formed which reduce the reflector capability of 5, grow through 4 and may thereby cause a short between 3 and 5; and 3. The manipulation of the akali metal and the finished, unprotected system must take place in an inert atmosphere since deleterious chemical reactions would otherwise take place.

It is a general object of the present invention to create a new kind of electrochromic mirror which does not have the disadvantages described above.

Upon study of the specification and appended claims, further objects, features and advantages of the present invention will become more fully apparent to those skilled in the art to which this invention pertains.

BEST MODE FOR CARRYING OUT THE INVENTION

Figure 1:
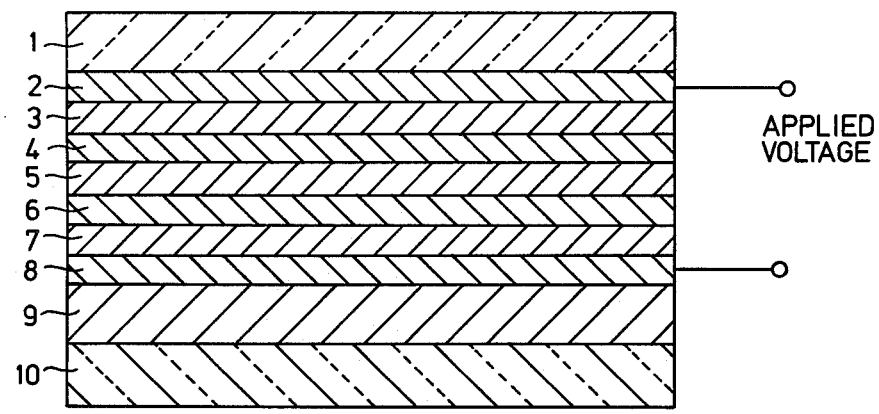
FIGS. 1 through 5 show the configurations of Examples 1 through 5, respectively.
Figure 2:
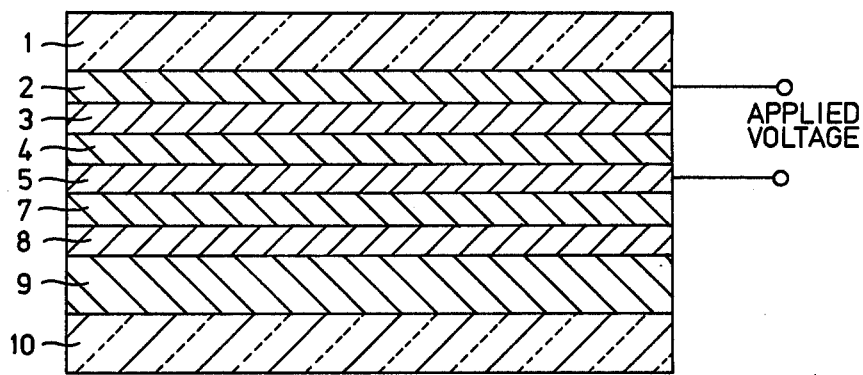
Figure 3:
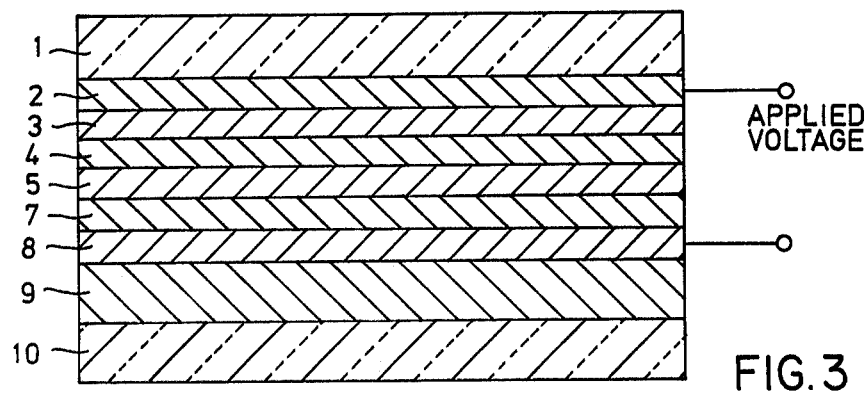
Figure 4:
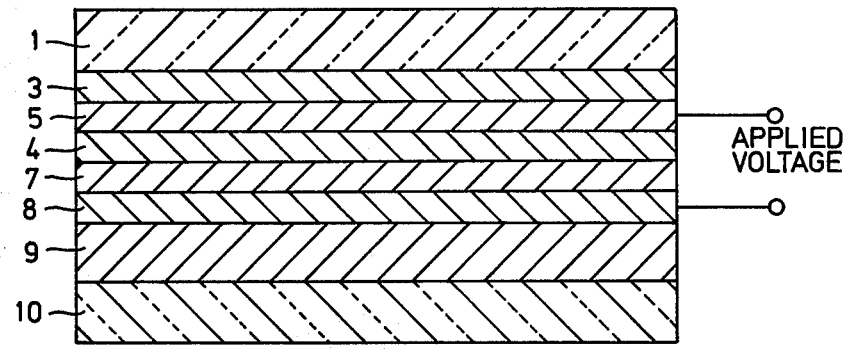
Figure 5:
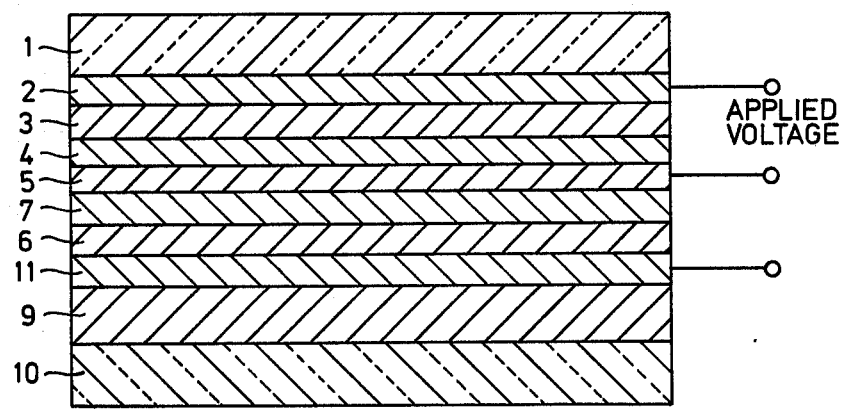

Briefly, the above and other objects, features and advantages of the present invention are attained in one aspect thereof by providing an electrochromic mirror hermetically sealed from the ambient environment and comprising at least one electrode, at least one electrochromic layer, a reflector, at lest one ion-conducting layer, and at least one ion-supplying layer which simultaneously is an ion-storing layer and is not identical with the reflector, wherein the ion-conducting layer consists essentially of an ion-conducting inorganic solid.

Electrochromic mirrors in accordance with the present invention are thin-layer accumulators which are appropriately charged so that either the ion-storing or the EC-layer contains an excess of suitable ions, e.g. hydrogen ions. The maximum voltage of a fully charged accumulator of this type generally amounts to about 0.5 V in case hydrogen ions are used; the electrode which is adjacent to the hydrogen ion-containing layer is negative. When the light reflected by the reflector is to be reduced in intensity, a positive voltage of no less than 0.5 V is applied. The hydrogen ions then migrate from the ion-storing layer through the layer system and into the EC-layer and there form the light absorbing compound $H_xWO_3$ (tungsten bronze). This process continues to accelerate as continuously higher voltages are applied; these should, however, generally not substantially exceed 5 V in order to avoid shorts caused by electric bursting.

For a given constant thicknesses of the $WO_3$ layer, the degree of light reduction is determined by the value of x in $H_xWO_3$. By adjusting the dosage of charge flowing into the $WO_3$ layer, it is easily possible to set the desired degree of light reduction.

It is advisable to eliminate reflection from the outer upper surface of the substrate in order to reduce the constant reflection portion, which, for example, amounts to 4 percent in a substrate glass with a refractive index of 1.5. Additionally, in order to suppress the reflection portion at the boundary between substrate and transparent electrode, a layer with a refractive index n may be applied in front of the former (boundary), with the refractive index n having a value of $$\sqrt{n_{TE} n_{substrate}} \; ;$$

The value of $n_{TE}$ (refractive index of the transparent electrode) lies around 2.0, approximately, for the customarily used materials of $SnO_2$ or $SnO_2$—enriched $In_2O_3$. Suitable layer materials with the required n include but are not limited to $Al_2O_3$ and $CeF_3$. Light transmission in the visible range of the spectrum should not be less than 80 percent for the transparent electrode, and its surface resistance should not lie above 10 ohms/square. Layers with such properties can be manufactured in accordance with the state of the art, e.g. by metallizing, cathode sputtering, and CVD.

The electrochromic (EC) layer can consist essentially of $WO_3$, $MoO_3$, $IrO_2$, $WO_3$—$MoO_3$ and $WO_3$—$MoO_3$—$M_2O$-mixtures (M being an alkali metal), or of a $WO_3$ glass. In order to obtain a weakening factor of $f \leq 0.01$, which can be defined as the ratio between the reflected light intensity in the colored and the reflected light intensity in the transparent state, the EC-layer should be no thinner than 100 nm. The upper limit of 2-5 μm is determined by mechanical tensions which grow with increasing layer thicknesses.

The conduction of hydrogen ions into "Solid Ion Conductor" layers (S.I. Layers) is predominantly made possible by water inclusions. The inclusion of water can be achieved by maintaining a partial steam pressure during the application of the S.I. Layer or by storing the finished EC-system in an atmosphere containing water vapour. In either case, it is advantageous for the S.I. layer to have a strtucture which is as porous as possible, which, for example, occurs during metallizing at high rate (e.g. 5 nm/s for $SiO_2$) or under increased gas pressure (e.g. $5 \times 10^{-4}$ mbar Ar).

At a minimum, the S.I. layer should be thick enough to make it improbable that the electrons can tunnel through ($d \geq 15$ nm). Mechanical tensions and increased ion resistance determine the upper limit of the thickness so that d-values of greater than 5 nm are generally unfavorable. In cases where the color position of a reflection spectrum is given or where the reflection capability of the EC-mirror must be as high as possible in the desired spectral range in the bright state, then the thicknesses of the EC and S.I. layers can no longer be chosen independently of each other but are instead interference-optically connected.

Materials which have an electron conductivity as low as possible, the capability to store water vapour, have low light absorption in the desired spectral range, and have low splash tendencies and the ability to be metallized with practically no decomposition are suitable for the manufacture of S.I. layers for hydrogen ions. Such materials include but are not limited to the oxides of Si, Zr, B, Nd, La, and mixtures thereof, and metallized glasses, such as the SCHOTT-Aufdampfglas 8329 (Schott Metallized Glass 8329); moreover, the fluorides of Mg, Ce, La, Nd, Y, Ca, Na, Li, Th, and mixtures thereof with each other (e.g. kryolith) and with one or more of the above mentioned oxides.

Metals are suitable for the manufacture of the reflector if they have a high permeability for monovalent ions, e.g. Pd, Pt, Rh and Pd—Ag-alloys, in cases where hydrogen ions are used. A layer thickness of about 50 nm is generally sufficient; the reflector then has practically the same reflection capability as the solid metal. Due to the poor adhesion properties of such metals with oxide and fluoride layers, it is recommended to package the reflector layer in thin, optically invisible adhesion-providing layers. Ti has proved itself for this purpose.

When the reflector does not simultaneously act as an electrode, it need not conduct electrons but can be in the form of a dielectric mirror, comprising $\lambda/(4 \cdot n)$ thick, ion-conducting layers with a dielectric with alternating high and low refraction, wherein n represents the refractive index of the highly refractive or low-reflective di-electric and x represents the central wave length of the high-reflecting spectral range. This type of mirror is particularly advantageous because, even with only a few (4-5) layer pairs, it achieves a reflection capability of more than 90 percent as in contrast to Pd with about 65 percent at a wavelength of 550 nm.

Suitable materials for the layers with low refractive properties, e.g, if the coloring ions are hydrogen ions, include but are not limited to $SiO_2$, $MgF_2$, $ThF_4$, and cryolith; and for those with high refractive properties, $WO_3$, $MoO_3$, $WO_3$—$MoO_3$ and $WO_3$—$MoO_3$—$M_2O$-mixtures (M being an alkali metal), $WO_3$-glass, and $ZrO_2$.

It has proven useful to manufacture the ion-storing layer of the same material and at least as thick as the EC-layer; the latter property has a positive influence on the speed of coloring and brightening rate of the mirror.

If the coloring ions are to be hydrogen ions and if their inclusion into the storage layer is to take place by means of treatment of the mirror in an atmosphere which contains hydrogen, then a layer with catalytic properties is applied as last layer.

The catalytic layer and the catalytic electrode are layers made of suitable metal, which can absorb the molecular hydrogen from the hydrogen-containing atmosphere and can break it down into hydrogen atoms. The adjacent layer is capable of absorbing hydrogen atoms and conducting hydrogen ions. As the storage capacity depends on the external hydrogen partial pressure, the latter can be used to easily control the degree of hydrogen incorporation.

Suitable such catalytic materials include but are not limited to Pd, Pt, Rh, Ni, $La_2Ni_5$, and FeTi. The catalytic layer may be very thin; for example, with Pd it is sufficient to have a thickness of 1 nm in order to achieve the desired effect. If it is to serve simultaneously as an electrode, a minimum thickness of about 10 nm is required in order to have a sufficient electron conductivity.

The face pane may comprise glass, metal or plastics. An epoxide adhesive, for example, guarantees a sealing of the system which is sufficiently dense to form a hermetic seal; metal solders may also be used. If the seal has to be particularly resistant to mechanical stresses, it is preferred to apply a face pane, which may consist of glass, plastics, or metal, by using an adhesive or a solder.

The types of mirror described in the following examples exhibit different advantages during their manufacture or during operation. Such types of mirror are insensitive to being splashed or having dust deposited during the coating process and can therefore be manufactured under less than clean-room conditions. This property is the result of the second ion-conducting layer.

Some of the mirrors described possess a somewhat better mechanical stability as a result of the low number of layers. It is also advantageous that under certain circumstances it is possible to do without the relatively expensive transparent electrode.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure is any way whatsoever.

Illustrative arrangements for electrochromic mirrors are described below which can be made in accordance with the present invention using starting materials and manufacturing methods which are well known to those of ordinary skill in the art to which this invention pertains. The electrochromic mirror may, for example, be characterized by the following line of sight configurations:

EXAMPLE 1

1—a glass substrate
2—a transparent electrode
3—an electrochromic layer
4—a solid, ion-conducting layer
5—a reflector which is permeable for hydrogen ions
6—a solid ion-conducting layer
7—an ion-storing layer
8—a catalytic layer, acting simultaneously as an electrode
9—an adhesive
10—a face pane The ion-storing layers of the mirrors in Examples 1–4 are charged with hydrogen by covering the ion-storing layer with diluted $H_2SO_4$, for example, and by touching it at any point with an indium wire. The mechanism of this process has been described by R. S. Crandall and B. W. Faughnan in Appl. Phys. Lett. 26: 120–21 (1975).

EXAMPLE 2

1—a glass substrate
2—a transparent electrode
3—an electrochromic layer
4—a solid, ion-conducting layer
5—a hydrogen-permeable reflector acting simultaneously as an electrode,
7—an ion-storing layer
8—a catalytic layer
9—an adhesive and
10—a face pane

EXAMPLE 3

1—a glass substrate
2—a transparent electrode
3—an electrochromic layer
4—a solid, ion-conducting layer
5—a hydrogen-permeable reflector
7—an ion-storing layer
8—a catalytic layer, acting simultaneously as an electrode,
9—an adhesive
10—a face pane

EXAMPLE 4

1—a glass substrate
3—an electrochromic layer
5—a hydrogen-permeable reflector acting simultaneously as electrode,
4—a solid, ion-conducting layer,
7—an ion-storing layer,
8—a catalytic layer, acting simultaneously as an electrode,
9—an adhesive,
10—a face pane.

EXAMPLE 5

1—a glass substrate
2—a transparent electrode
3—an electrochromic layer
4—a solid, ion-conducting layer
5—a hydrogen-permeable reflector, acting simultaneousy as an electrode,
7—an ion-storing layer,
6—a solid, ion-conducting layer
11—an electrode permeable to water-vapour (steam)
9—an adhesive
10—a face pane.

The incorporation of external hydrogen into the ion-storing layer in the mirror described in Example 5 takes place by means of an electrolysis of the steam which diffuses from the atmosphere via 11 into 6 when a voltage of about 2 V is applied to 5 and 11 (11 being the positive pole). The mirror now contains the hydrogen necessary for its operation and is operated via the electrodes 2 and 5.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

INDUSTRIAL APPLICABILITY

As can be seen from the present specification and examples, the present invention is industrially useful in providing electrochromic mirrors which can be electrically switched to different optical constants.

What is claimed is:

1. In an electrochromic mirror hermetically sealed from the ambient environment and comprising at least two electrodes, at least one electrochromic layer, a reflector, at least one ion-conducting layer, and at least one ion-supplying layer which simultaneously is an ion-storing layer and is not identical with the reflector, the improvement wherein the ion-conducting layer consists essentially of an ion-conducting inorganic solid and the mirror has a line of sight configuration selected from the group consisting of:
   (a) a glass substrate; a transparent electrode; an electrochromic layer; a solid, ion-conducting layer; a hydrogen-permeable reflector; a solid ion-conducting layer; an ion-storing layer; a catalytic layer acting simultaneously as an electrode; an adhesive; and a face pane;
   (b) a glass substrate; a transparent electrode; an electrochromic layer; a solid, ion-conducting layer; a hydrogen-permeable reflector acting simultaneously as an electrode; an ion-storing layer; a catalytic layer; an adhesive; and a face pane;
   (c) a glass substrate; a transparent electrode; an electrochromic layer; a solid, ion-conducting layer; a hydrogen-permeable reflector; an ion-storing layer; a catalytic layer acting simultaneously as an electrode; an adhesive; and a face pane;
   (d) a glass substrate; an electrochromic layer; a hydrogen-permeable reflector acting simultaneously as an electrode; a solid, ion-conducting layer; an ion-storing layer; a catalytic layer acting simultaneously as an electrode; an adhesive; and a face pane; and
   (e) a glass substrate; a transparent electrode; an electrochromic layer; a solid, ion-conducting layer; a hydrogen-permeable reflector acting simultaneously as an electrode; an ion-storing layer; a solid, ion-conducting layer; an electrode permeable to water-vapor; an adhesive; and a face pane.

2. An electrochromic mirror as in claim 1, wherein the reflector is a metallic layer.

3. An electrochromic mirror as in claim 2, wherein the metallic layer comprises ruthenium, rhodium, palladium, osmium, iridium, platinum, or a mixture thereof.

4. An electrochromic mirror as in claim 3, wherein the metallic layer is an alloy of one or more of said metals with silver, gold, or a combination thereof.

5. An electrochromic mirror as in claim 1, wherein the reflector is a dielectric sequence of layers.

6. An electrochromic mirror as in any one of claims 1 through 5, wherein the ion-storing layer is simultaneously an electrochromic layer.

7. An electrochromic mirror as in claim 6, wherein the ion-storing layer is at least one oxide of at least one of the elements in groups IV B, VB, VI B or VIII of the Periodic System of Elements.

8. An electrochromic mirror as in claim 6, wherein the ion-storing layer is a glass which contains at least one oxide of the elements of groups V B or VI B of the Periodic System of Elements.

9. An electrochromic mirror as in any one of claims 1 through 5, wherein the ion-storing layer is graphite.

10. An electrochromic mirror as in one of claims 1 through 6, wherein the ion-storing layer consists of essentially of graphite and at least one oxide of at least one of the elements in Groups IV B, V B, VI B or VIII of the Periodic System of Elements.

11. An electrochromic mirror as in one of claims 1 through 10, wherein the ion-storing layer contains platinum, palladium, or nickel.

12. An electrochromic mirror as in one of claims 1 through 11, wherein the ion-storing layer contains FeTi and/or LaNi$_5$.

13. An electrochromic mirror as in one of claims 1 through 12, wherein the ion-conducting layer contains an oxide of silicon, zirconium, titanium, or mixtures thereof.

14. An electrochromic mirror as in one of claims 1 through 12, wherein the ion-conducting layer contains at least one fluoride of at least one element of groups II A or III B of the Periodic System of Elements.

15. An electrochromic mirror as in one of claims 1 through 14, which is hermetically sealed by means of an organic adhesive.

16. An electrochromic mirror as in one of claims 1 through 14, which is hermetically sealed by means of an organic varnish.

17. An electrochromic mirror as in one of claims 1 through 14, which is hermetically sealed by means of a layer of inorganic material.

18. An electrochromic mirror as in one of claims 1 through 17, which is hermetically sealed by means of a solid plate made of glass, plastic, or metal.

19. An electrochromic mirror as in one of claims 1 through 18, further comprising an additional catalytic layer for supplying the adjacent ion-storing layer with hydrogen during manufacturing.

20. An electrochromatic mirror as in claim 19, wherein said catalytic layer serves as an electrode after manufacture of the mirror has been completed.

21. An electrochromic mirror as in one of claims 15 through 17, wherein the adhesive, varnish, or inorganic material conducts electrons.

* * * * *